(12) United States Patent
Lin

(10) Patent No.: US 6,543,743 B2
(45) Date of Patent: Apr. 8, 2003

(54) GAS CONTROL VALVE

(76) Inventor: Arlo H. T. Lin, No. 5, Lane 25, Da-Tong Rd., Wu-Feng Hsiang, Taichung Hsien (TW)

( * ) Notice: Subject to any disclaimer, the term of this patent is extended or adjusted under 35 U.S.C. 154(b) by 0 days.

(21) Appl. No.: 09/902,670

(22) Filed: Jul. 12, 2001

(65) Prior Publication Data

US 2003/0010947 A1 Jan. 16, 2003

(51) Int. Cl.⁷ .............................................. F61K 31/00
(52) U.S. Cl. ....................................... 251/11; 137/78.4
(58) Field of Search ............................ 251/11; 137/78.4

(56) References Cited

U.S. PATENT DOCUMENTS

| | | | | |
|---|---|---|---|---|
| 2,040,864 A | * | 5/1936 | Mantz | 137/139 |
| 2,274,145 A | * | 2/1942 | Johson | 251/11 |
| 2,649,777 A | * | 8/1953 | Saper-Sztejn | 137/638 |
| 2,729,221 A | * | 1/1956 | Gorham et al. | 137/78.4 |
| 3,851,853 A | * | 12/1974 | Teeters | 251/214 |
| 3,877,476 A | * | 4/1975 | Mills | 137/75 |
| 3,951,381 A | * | 4/1976 | Whitener | 251/356 |
| 4,508,314 A | * | 4/1985 | Hemme | 251/11 |
| 4,593,882 A | * | 6/1986 | West | 251/243 |
| 4,836,496 A | * | 6/1989 | Abujudom et al. | 251/11 |
| 6,003,833 A | * | 12/1999 | Tasi et al. | 251/11 |

* cited by examiner

Primary Examiner—Henry C. Yuen
Assistant Examiner—Frederick C. Nicolas
(74) Attorney, Agent, or Firm—Charles E. Baxley

(57) ABSTRACT

A gas control valve includes a first element, a second element, a mediate element, a sleeve, a rod and a control element. The first element defines a first path. The second element defines a second path and a hole in communication with the second path. The mediate element defines a passage. The mediate element is sandwiched between the first and second elements so that the first path is in communication with the second path through the passage. The sleeve includes a first end and a second end. The first end of the sleeve is inserted into the hole. The rod includes a first and a second end. The rod is inserted into the sleeve so that the first end of the rod is inserted into the second path and that the second end of the rod is exposed through the second end of the sleeve. The control element is connected between the second end of the sleeve and the second end of rod. Normally, the control element keeps the rod in a first position wherein the first end of the rod opens the passage. When subjected to heat, the control element moves the rod to a second position wherein the first end of the rod closes the passage.

6 Claims, 4 Drawing Sheets

GAS CONTROL VALVE

FIELD OF THE INVENTION

The present invention relates to a gas control valve which uses an activation member made from memory alloy to control movement of a rod which is engaged with a gas passage in a gas burner.

BACKGROUND OF THE INVENTION

A conventional gas control valve is shown in FIG. 1 and generally includes two blocks 10 overlapped with each other, and a mediate plate 11 is clamped between the two blocks 10. A gas path 13 is defined between the two blocks 10 and the mediate plate 11 has a passage 12 defined therethrough which communicates with the gas path 13. An adjusting bolt 14 is movably inserted in one of the two blocks 10 and a tip of the adjusting bolt 14 is engaged with said passage 12 so that the user may rotate the adjusting bolt 14 to control a gap between the tip of the adjusting bolt 14 and the passage 12. By this way, the volume of the gas passing through the passage 12 can be controlled. It requires a tool to adjust the adjusting bolt 14 and the adjusting bolt 14 is usually located in an inside of the burners so that the users are not encouraged to do the job.

SUMMARY OF THE INVENTION

It is the primary objective of the present invention to provide a structurally simple gas control valve that normally allows gas to flow and when subject to heat blocks the gas.

According to the present invention, a gas control, valve includes a first element, a second element, a mediate element, a sleeve, a rod and a control element. The first element defines a first path. The second element defines a second path and a hole in communication with the second path. The mediate element defines a passage. The mediate element is sandwiched between the first and second elements so that the first path is in communication with the second path through the passage. The sleeve includes a first end and a second end. The first end of the sleeve is inserted into the hole. The rod includes a first end and a second end. The rod is inserted into the sleeve so that the first end of the rod is inserted into the second path and that the second end of the rod is exposed through the second end of the sleeve. The control element is connected between the second end of the sleeve and the second end of the rod. Normally, the control element keeps the rod in a first position wherein the first end of the rod opens the passage. When subjected to heat, the control element moves the rod to a second position wherein the first end of the rod closes the passage.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
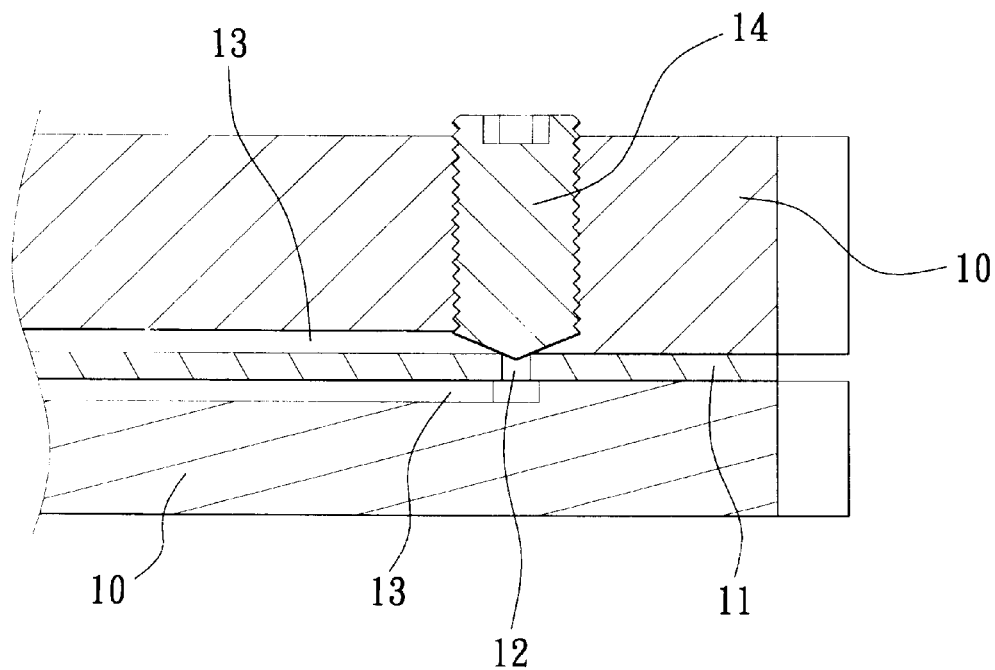
FIG. 1 is a cross sectional view to show a conventional gas control valve.
Figure 2:
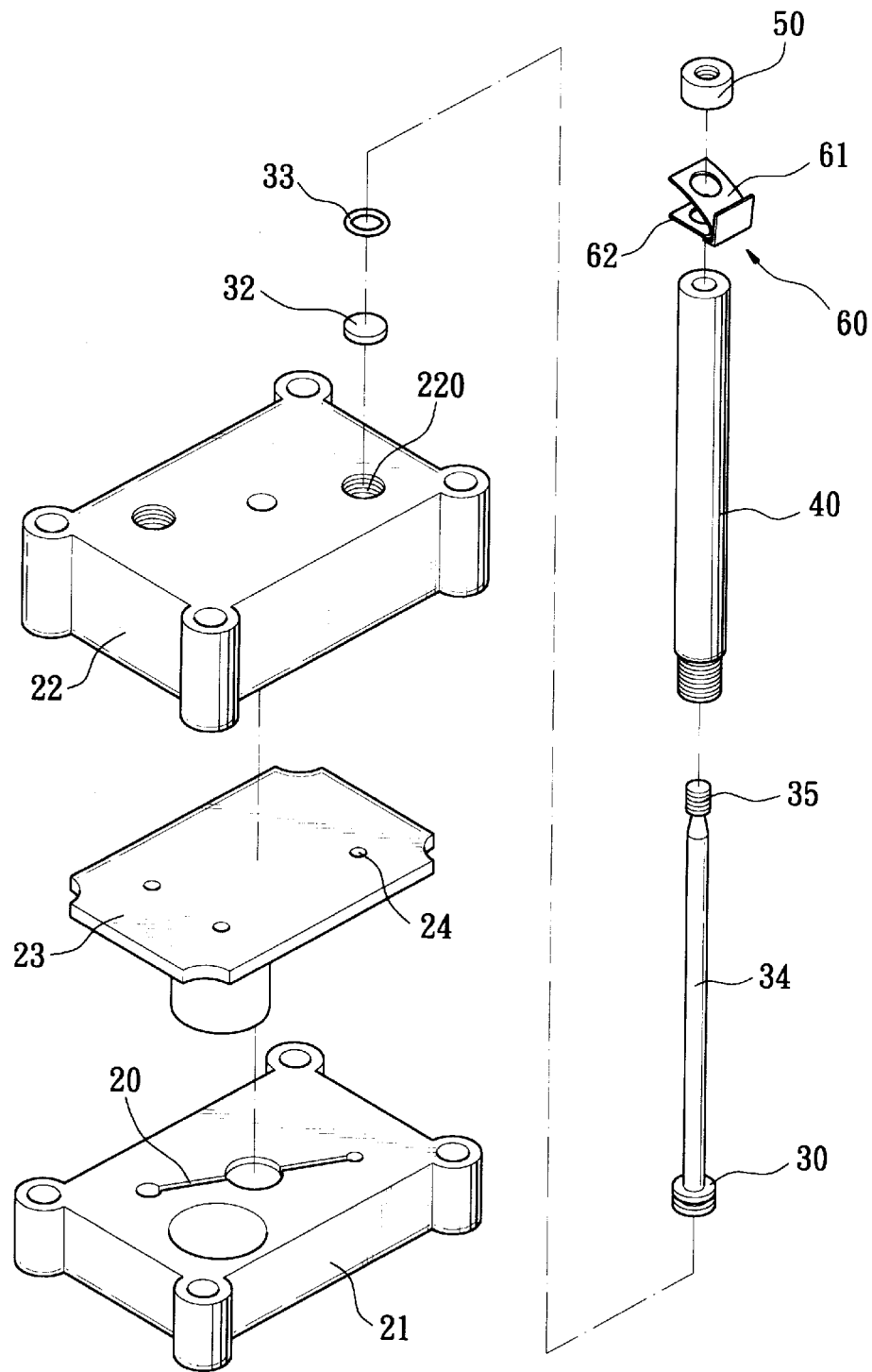
FIG. 2 is an exploded view to show a gas control valve of the present invention.
Figure 3:
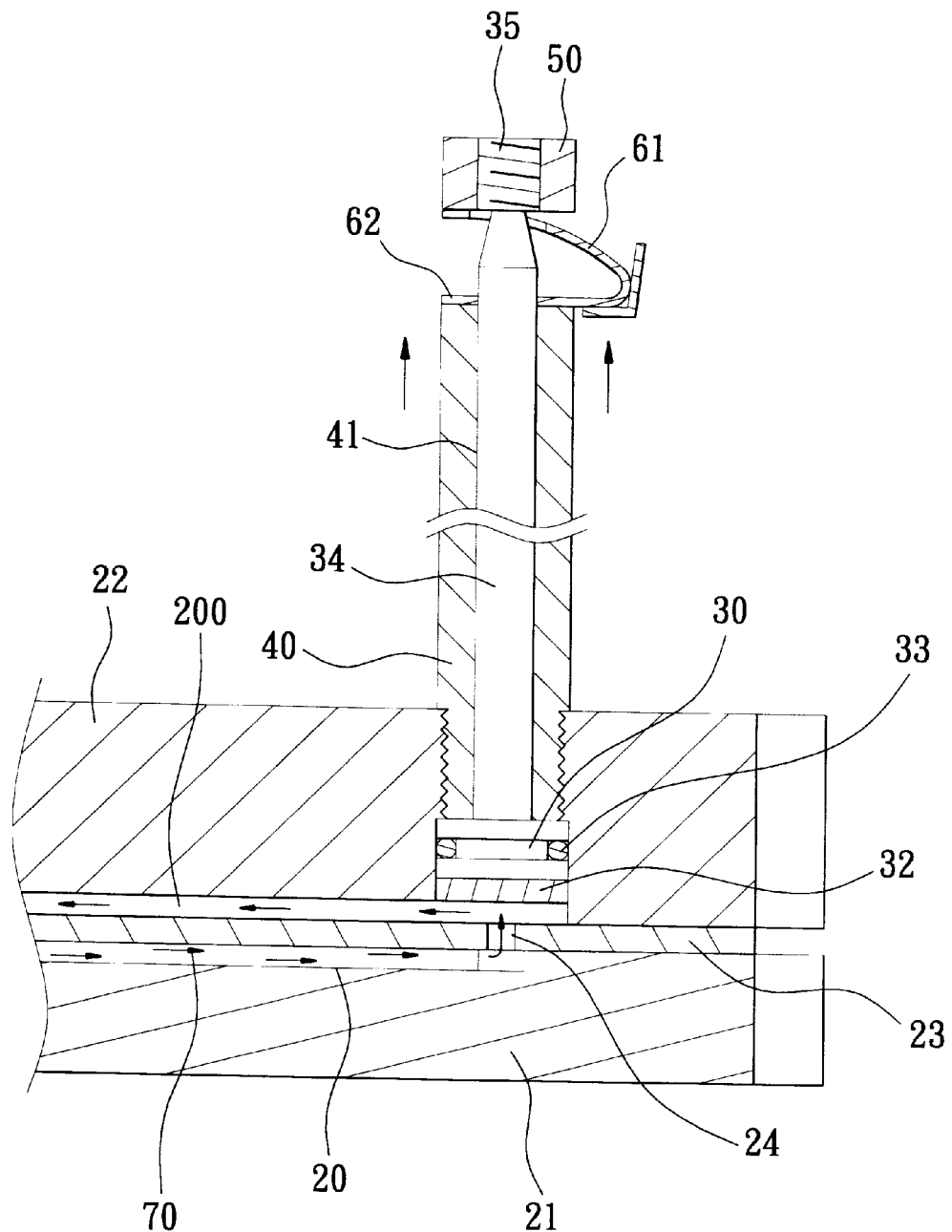
FIG. 3 is a cross sectional view to show the gas control valve of the present invention.

Referring to FIGS. 2 and 3, the gas control valve of the present invention comprises a first part 21 having a first gas path 20 defined in a top surface thereof and a mediate plate 23 is located on said top surface of said first part 21. A passage 24 is defined through said mediate plate 23 and communicates with said first gas path 20. A second part 22 is located on said mediate plate 23 and has a second gas path 200 defined in a bottom surface thereof The passage 24 communicates with the first gas path 20 and the second gas path 200. A hole 220 is defined through said second part 22 and communicates with said second gas path 200.

A sleeve 40 has a first end threadedly engaged with said hole 220 and a rod 34 is movably,received in said sleeve 40. A first end 30 of said rod 34 has a plurality of rings 33 mounted thereto which snugly engaged with an inside of said hole 220. An end disk 32 is connected to said first end 30 of said rod 34.

A memory member or bi-metal 60 is fixedly mounted to a second end 35 of said rod 34 and comprises a first plate 62 and a second plate 61. The second end 35 of the rod 34 extends out from the sleeve 40. The first plate 62 is mounted to the rod 34 and fixedly connected on a second end of said sleeve 40. The second plate 61 is fixedly mounted to said second end 35 of said rod 34. A head 50 is connected to said second end 35 of said rod 34 and said second plate 61 contacts an underside of said head 50.

Figure 4:
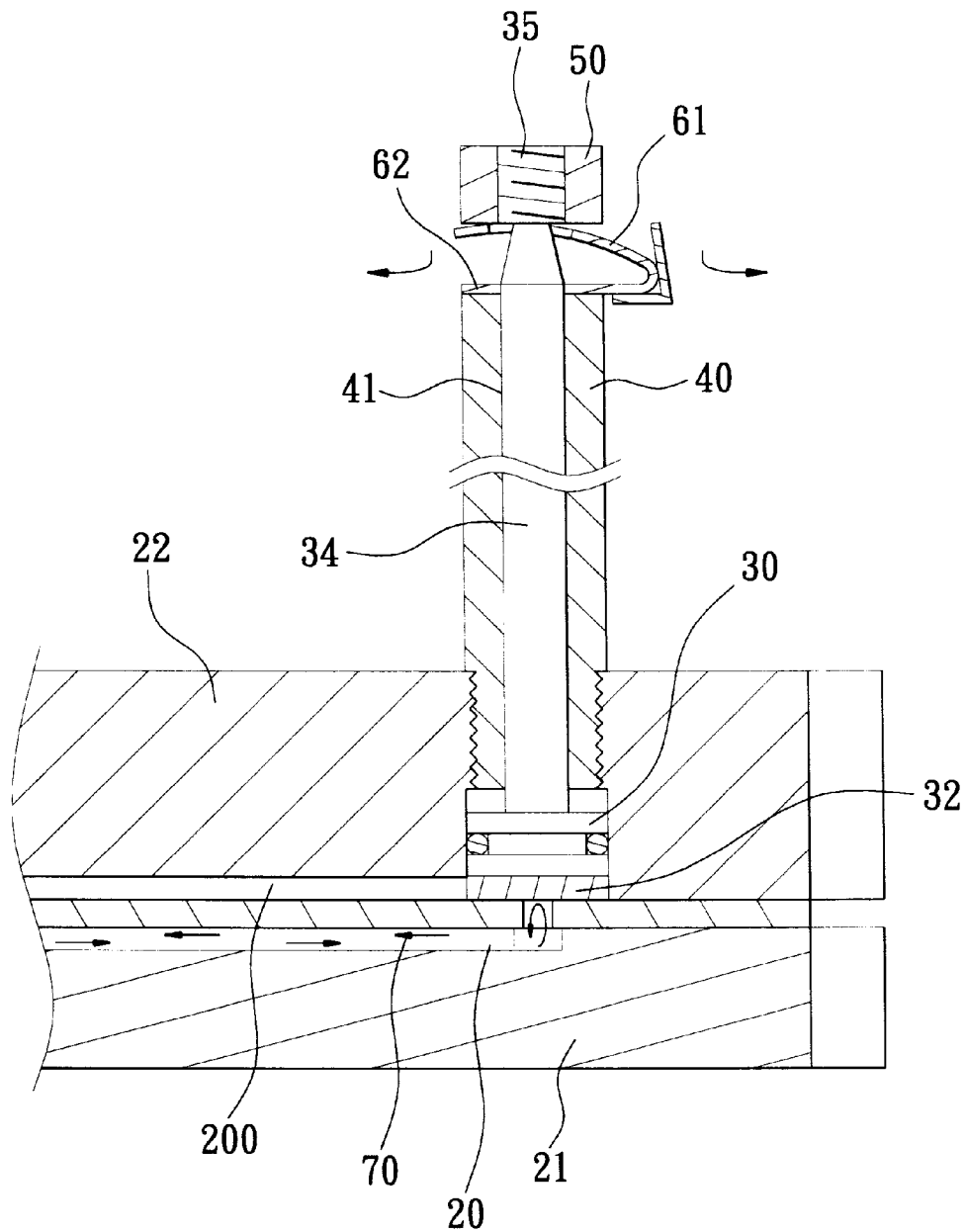
FIG. 4 is a cross sectional view to show that the rod is lowered to seal the passage in the mediate plate in the gas control valve of the present invention.

A shown in FIG. 4, the memory member or bi-metal 60 is located in the gas combustion chamber (not shown) so that it is sensory by the temperature in the combustion chamber. If the temperature of the combustion chamber is located in a pre-decided range, the memory member or bi-metal 60 will not be deformed. When the temperature, of the combustion chamber is out of the range, the memory member or bi-metal 60 is deformed and the first plate 61 is lowered to move the end disk 32 to seal the passage 24 to stop the gas passing through the passage 24. The gas control valve is able to control the volume of gas flow automatically.

While we have shown and described the embodiment in accordance with the present invention, it should be clear to those skilled in the art that further embodiments may be made without departing from the scope of the present invention.

What is claimed is:

1. A gas control valve, comprising:
   a) a first element (21) defining a first path (20);
   b) a second element (22) defining a second path (200) and a hole (220) in communication with the second path (200);
   c) a mediate element (23) defining a passage (24), the mediate element (23) being sandwiched between the first and second elements (21,22) so that the first path (20) is in communication with the second path (200) through the passage (24);
   d) a sleeve (40) including a first end and a second end, the first end of the sleeve (40) being inserted in the hole (220);
   e) a rod (34) including a first and a second end, the rod (34) being inserted in the sleeve (40) so that the first end of the rod (34) is inserted in the second path (200) and that the second end of the rod (34) is exposed through the second end of the sleeve (40); and
   f) a control element (60) linked between the second end of the sleeve (40) and the second end of rod (34) so as to keep the rod (34) in a first position wherein the first end of the rod (34) opens the passage (24) and when subjected to heat moves the rod (34) to a second position wherein the first end of the rod (34) closes the passage (24).

2. The gas control valve as claimed in claim 5, wherein said first end of said rod has a plurality of rings mounted thereto which snugly engage with an inside of said hole.

3. The gas control valve as claimed in claim 2 further comprising an end disk connected to said first end of said rod.

4. The gas control valve according to claim 1, wherein the control element (60) is a bi-metal element.

5. The gas control valve according to claim 4, wherein the bi-metal element (60) includes a first plate (62) connected with the second end of the sleeve (40) and a second plate (61) connected with the second end of rod (34).

6. The gas control valve according to claim 5, wherein when the control element (60) is subjected to heat, the second plate (61) thereof pivots toward the first plate (62) thereof.

* * * * *